Sept. 21, 1948.　　　R. I. SANDERSON ET AL　　　2,449,955
GRIP MECHANISM FOR TESTING MACHINES Filed Jan. 9, 1947　　　3 Sheets-Sheet 1

INVENTORS:
ROBERT I. SANDERSON and
EUGENE R. TROSTLE,
by: Donald G. Dalton
their Attorney.

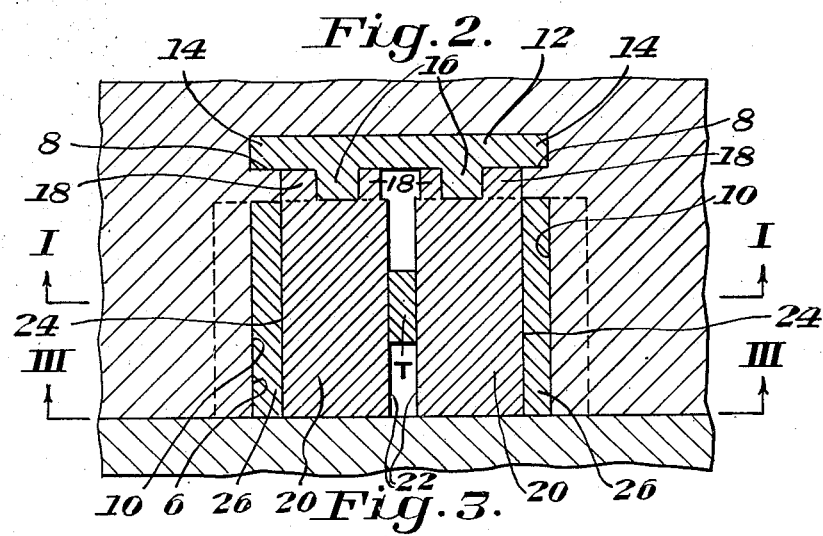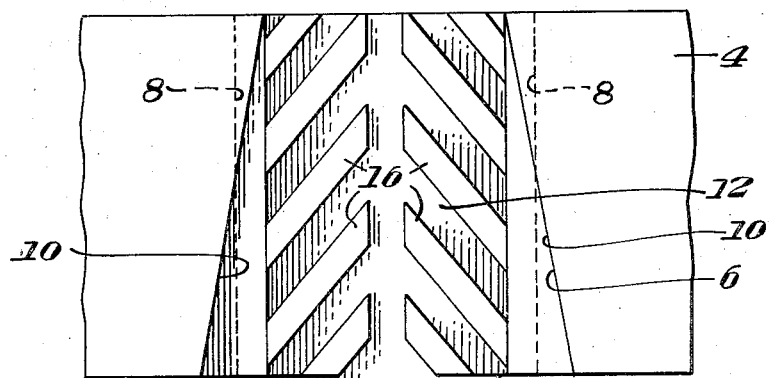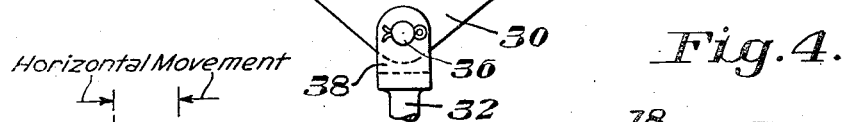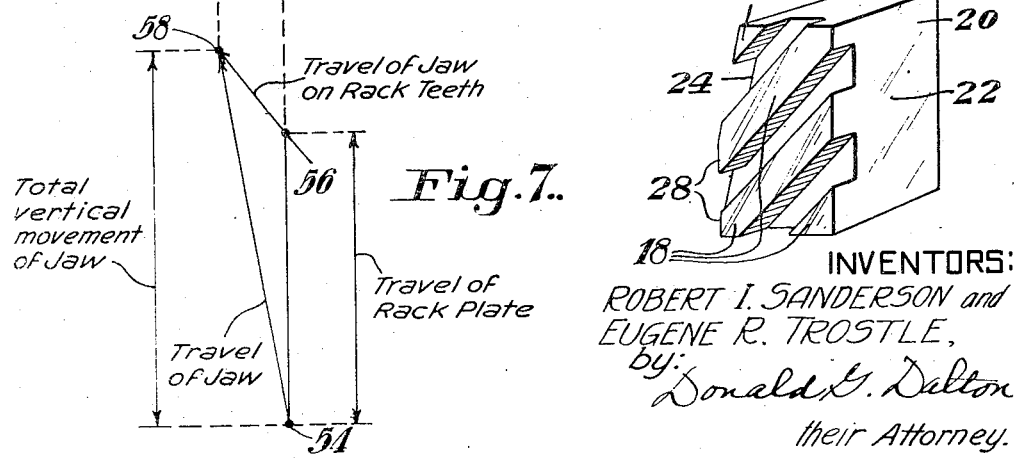
INVENTORS:
ROBERT I. SANDERSON and
EUGENE R. TROSTLE,
by: Donald G. Dalton
their Attorney.

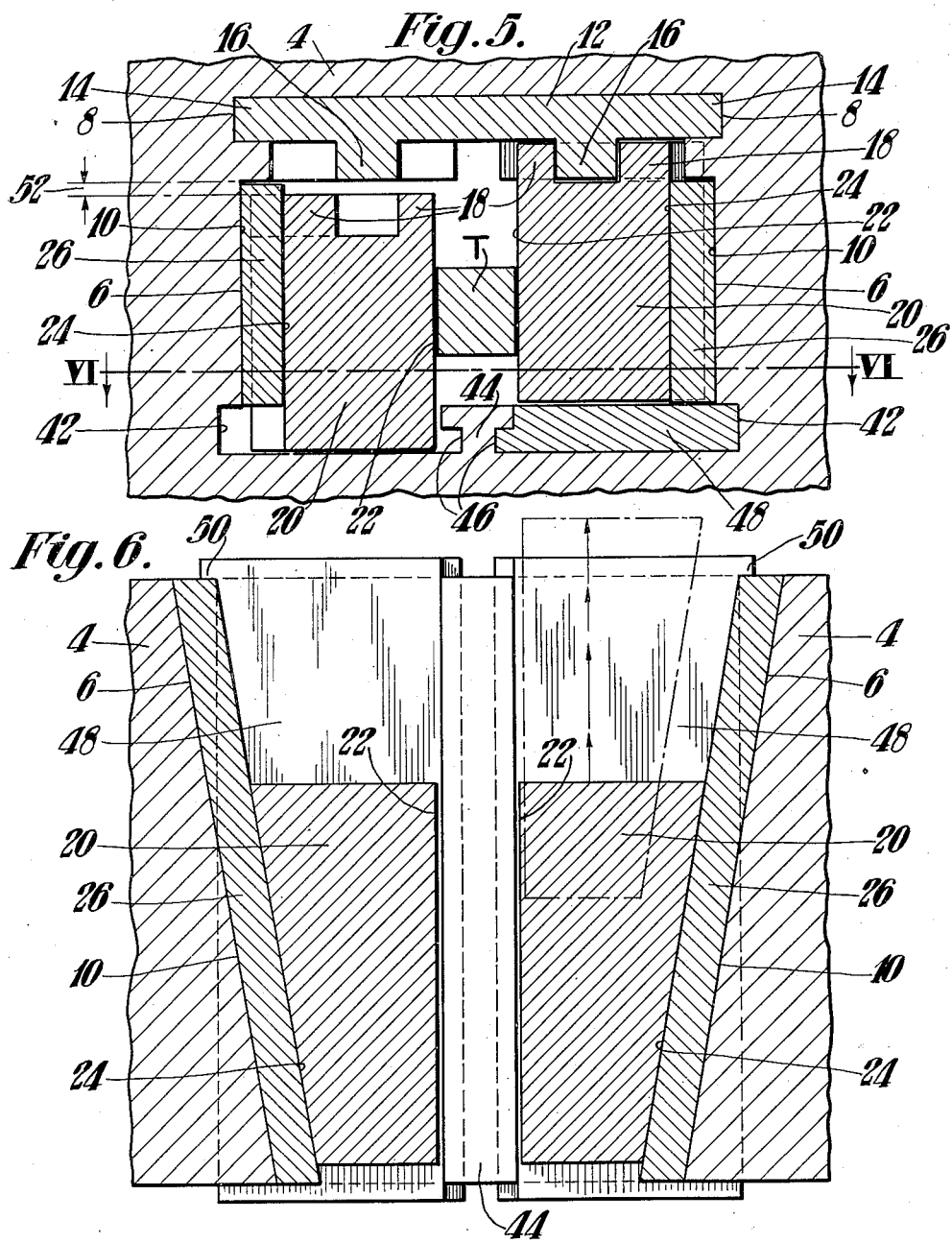

Patented Sept. 21, 1948

2,449,955

UNITED STATES PATENT OFFICE 2,449,955

GRIP MECHANISM FOR TESTING MACHINES

Robert I. Sanderson, Gary, and Eugene R. Trostle, East Gary, Ind.

Application January 9, 1947, Serial No. 721,014

4 Claims. (Cl. 73—103)

This invention relates to grip mechanism for testing machines and more particularly to mechanism for operating wedge type grips in a tensile testing machine.

In testing machines now in common use, the grips applied with the machine are not dependable at heavy loads such as 200,000 pounds. When the test specimen breaks the gripping mechanism cannot stand the jolt and the broken specimen and even parts of the machine are thrown around to make the operation of the machine hazardous. Certain improvements have been made which prevent the grips from being thrown from the machine, but the mechanism is complicated and requires considerable maintenance. The travel of the gripping jaws is limited and in case of overrun, something must break. In the present machines the mechanism is the weakest part and will break It is an object of this invention to provide grip mechanism which is simple in construction and in which the grip is easily secured and released.

Another object is to provide a device in which the gripping mechanism will float and the travel of the jaws is not limited.

Still another object is to provide a device in which means are provided to permit the parts thereof to be easily assembled.

These and other objects will be more apparent after referring to the following specification and attached drawings, in which:

Figure 2 is a horizontal section on the line II—II of Figure 1;

Figure 3 is a view taken on the line III—III of Figure 2 with the gripping jaws and shims removed;

Figure 4 is a perspective view of one of the gripping jaws;

Figure 5 is a view similar to Figure 2, but showing the preferred embodiment of the invention;

Figure 6 is a sectional view taken on the line VI—VI of Figure 5; and

Figure 7 is a diagram showing the movement of the jaws.

Figure 1:
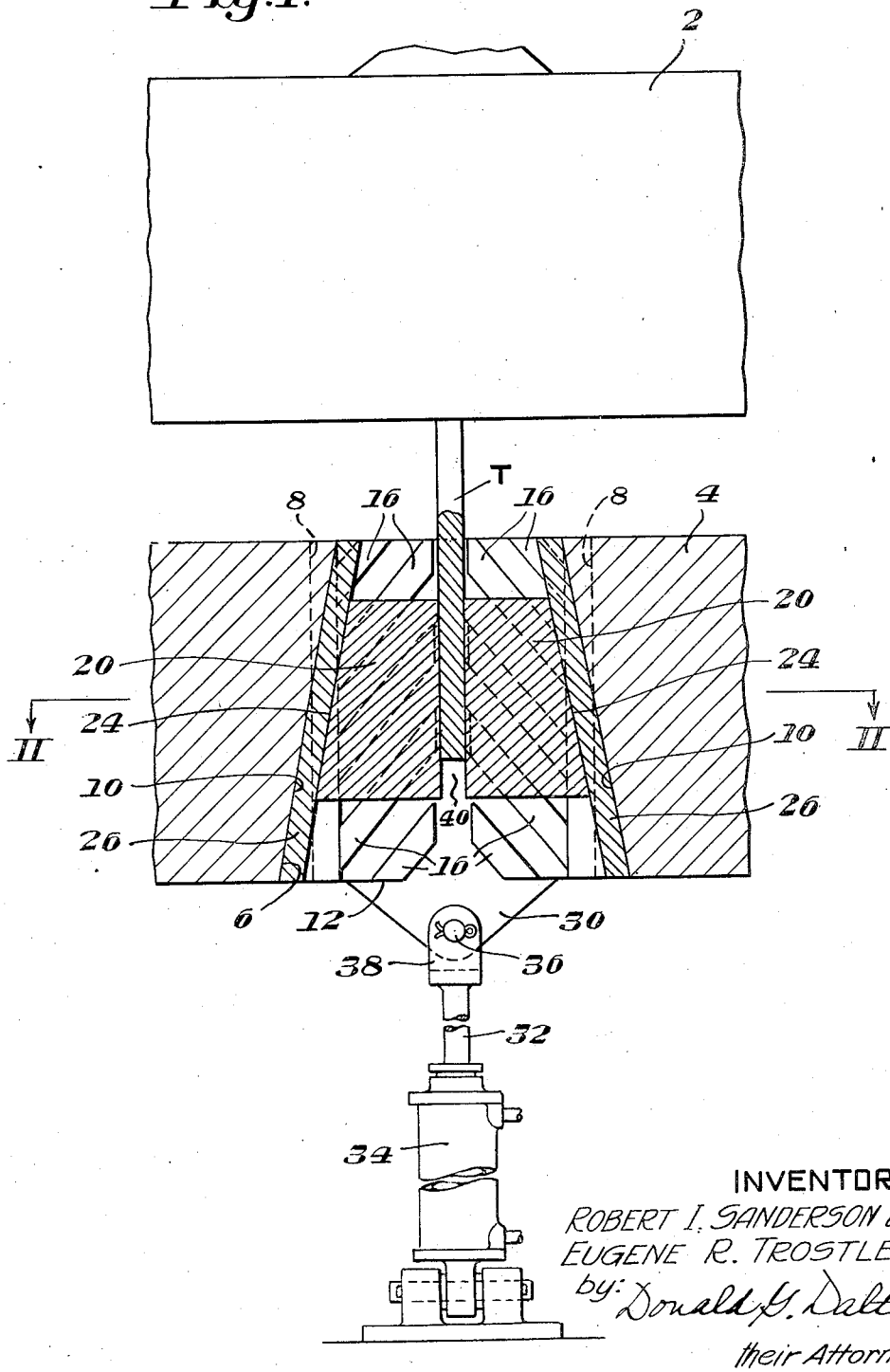
Figure 1 is a side elevational view partly in cross section, the part in section being taken on the line I—I of Figure 2.

Referring more particularly to the drawings, reference numerals 2 and 4 indicate the top and bottom crossheads of a tensile testing machine. The gripping mechanism in the top crosshead is the reverse of the bottom mechanism and therefore, only the bottom gripping mechanism will be described, it being understood that the top gripping mechanism is similar thereto. The crosshead 4 is provided with a jaw hole 6 having slots 8 at one end and wedge surfaces 10 on each side. A slide rack plate 12, having tongues 14 fitting in slots 8, is provided with rack teeth 16 on each side of the center line of the test piece T, the teeth extending from the outside edge upwardly at an angle toward the center line of the test piece. Meshing with the teeth 16 are teeth 18 arranged on a pair of opposed jaws 20, one jaw being on each side of the center line of the test piece. Each jaw is provided with a gripping surface 22 on its inner side and a wedge surface 24 on the side opposite the gripping surface, the wedge surfaces 24 having the same taper as the wedge surfaces 10. The gripping surface 22 is shaped to correspond to the shape of the test piece. A shim 26 may be provided between each of the wedge surfaces 10 and the jaws 20. The jaw teeth 18 are cut away at 28 to permit a little extra spread of the jaws. The bottom of the sliding rack plate 12 is provided with an extension 30 which is connected to the piston rod 32 of an air cylinder 34. The connection between the extension 30 and piston rod 32 is easily broken and as shown consists of a pin 36 which passes through holes in the extension 30 and the bifurcated end 38 of the piston rod 32.

In operation the jaws 20 are assembled symmetrically on the rack plate 12 with the teeth 16 and 18 in mesh. The assembly is then fitted in the hole 6 of the testing machine head 4 with the tongues 14 fitting in the slots 8. The shims 26 are put in place and the piston 32 connected to the extension 30. Air is introduced into the bottom of the cylinder 34 to move the rack plate 12 upward. This causes the jaws 20 to rise and since they are guided by the wedge surfaces 24, they will move inwardly to close the grip 40. In case one of the jaws tends to slip its grip on the test specimen, the opposite jaw moves relatively forward and the teeth 18 exert a pressure on teeth 16 of the rack plate 12 which will transmit the force to the opposite side where the teeth 16 will bear on the teeth 18 of the opposite jaw and force it forward. This equalizing feature insures positive gripping of the specimen T.

While the mechanism will operate as described above, it is preferred to provide means for facilitating assembly of the parts of the gripping mechanism. For this purpose the jaw holes 6 are provided with a pair of slots 42 on the end thereof opposite the slots 8. A T-shaped partition 44 is provided between the slots 42 so that the adjacent ends of the slots 42 are reduced in width at 46. A filler plate 48 having a stop lug 50 at its upper end is adapted to be inserted into each slot 42. The maximum width of slots 42 is such that a clearance 52 is provided between the teeth 16 and 18 when the jaws 20 are positioned against the back wall of slots 42.

With this arrangement the mechanism is assembled as follows:

The rack plate 12 is positioned in the slots 8 and one of the jaws 20 is projected into the jaw hole 6 with its narrow end foremost and the side thereof opposite the teeth 18 positioned against the back wall of slot 42. When the jaw 20 has reached its desired vertical position, it is moved toward the rack plate 12 to bring the teeth 16 and 18 into mesh. The filler plate 48 is then dropped into the slot 42 and moved downwardly until the stop lug 50 rests on the top of crosshead 4, thus holding the jaw 20 in place as shown in Figure 6. The second jaw is then positioned in the same manner and the shims or liner plates 26 are dropped into position. The operation of the device is then the same as set forth above. With this arrangement the filler plate 48 can be removed and either jaw 20 can be easily backed out of mesh with the rack plate 12 and withdrawn from the head without disturbing the rest of the assembly.

Referring to the vector diagram of Figure 7, it will be seen that as the sliding rack plate 12 moves from point 54 to point 56 there will be a horizontal movement of the jaws equal to the horizontal distance between points 56 and 58. Since the jaws rest on the inclined teeth 16, the inward movement also causes the jaw to move upward on the slope of the teeth a distance represented by the vertical distance between points 56 and 58. Thus, it will be seen that the jaws move from point 54 to point 58 when the rack plate moves from point 54 to point 56. The specimen is then gripped in the upper jaws and tension is applied to the test piece in the usual manner. After the initial grip is secured by movement of the sliding rack plate 12, the rack ceases to function and assumes a floating position during which it is practically free from all stresses. The pull of the machine and the wedging action of the jaws tightens and maintains the grip during the entire loading of the specimen. The jaws are free to overrun in both directions so that the load is always carried by the jaws and is not transferred to the mechanism. Air pressure is maintained in the cylinder 34 during the entire pulling of the test specimen so that it acts as a pneumatic cushion to absorb the force of the rebound when the specimen breaks.

While two embodiments of our invention have been shown and described, it will be apparent that other adaptations and modifications may be made without departing from the scope of the following claims.

We claim:

1. Grip mechanism for the test piece in a tensile testing machine comprising a pair of opposed jaws, one on each side of the center line of the test piece, a gripping surface on each jaw, a wedge surface on each jaw on the side opposite the gripping surface, corresponding wedge surfaces on said machine, a sliding plate mounted in said machine along one side of both of the jaws, each of the jaws having teeth therein on the end adjacent the sliding plate, the teeth in each jaw extending at an angle from its wedge surface toward the plane of its gripping surface, the sliding plate having teeth therein meshing with the teeth in the jaws, and means for moving said sliding plate in a plane parallel to the axis of the workpiece.

2. Grip mechanism for the test piece in a tensile testing machine comprising a pair of opposed jaws, one on each side of the center line of the test piece, a gripping surface on each jaw, a wedge surface on each jaw on the side opposite the gripping surface, corresponding wedge surfaces on said machine, a sliding plate mounted in said machine along one side of both of the jaws, each of the jaws having teeth therein on the end adjacent the sliding plate, the teeth in each jaw extending at an angle from its wedge surface toward the plane of its gripping surface, the sliding plate having teeth therein meshing with the teeth in the jaws, and an air cylinder for moving said sliding plate in a plane parallel to the axis of the workpiece.

3. Grip mechanism for the test piece in a tensile testing machine as defined in claim 1 in which a filler plate is provided in said machine against the jaws on the side of said jaws opposite the sliding plate.

4. Grip mechanism for the test piece in a tensile testing machine as defined in claim 1 in which a pair of slots are provided in said machine on the side of the jaws opposite the sliding plate, and a filler plate is provided for each slot, said filler plates being thicker than the depth of the teeth in said jaws.

ROBERT I. SANDERSON.
EUGENE R. TROSTLE.

REFERENCES CITED

The following references are of record in the file of this patent:

UNITED STATES PATENTS

| Number | Name | Date |
| --- | --- | --- |
| 1,872,047 | Templin | Aug. 22, 1932 |
| 1,943,931 | Ruch | Jan. 16, 1934 |
| 2,001,711 | Dinzl | May 21, 1935 |
| 2,088,830 | Abegg | Aug. 3, 1937 |
| 2,419,711 | Dillon | Apr. 29, 1947 |